US010038926B2

(12) United States Patent
Heitlinger et al.

(10) Patent No.: US 10,038,926 B2
(45) Date of Patent: Jul. 31, 2018

(54) SERVER-SIDE BLACKOUT ENFORCEMENT

(71) Applicant: Verizon Patent and Licensing Inc., Basking Ridge, NJ (US)

(72) Inventors: Paul D. Heitlinger, Basking Ridge, NJ (US); David Brown, Lehi, UT (US); David Frederick Brueck, Saratoga Springs, UT (US); Kenneth Alan Brueck, Draper, UT (US); Tyler Willey, Saratoga Springs, UT (US); Calvin Ryan Owen, Draper, UT (US)

(73) Assignee: Verizon Digital Media Services Inc., Dulles, VA (US)

( * ) Notice: Subject to any disclaimer, the term of this patent is extended or adjusted under 35 U.S.C. 154(b) by 29 days.

(21) Appl. No.: 14/743,773

(22) Filed: Jun. 18, 2015

(65) Prior Publication Data

US 2016/0373794 A1    Dec. 22, 2016

(51) Int. Cl.
*H04N 21/258* (2011.01)
*H04N 21/254* (2011.01)
*H04N 21/426* (2011.01)

(52) U.S. Cl.
CPC ... *H04N 21/25883* (2013.01); *H04N 21/2541* (2013.01); *H04N 21/42684* (2013.01)

(58) Field of Classification Search
CPC ......... H04N 21/25841; H04N 21/2541; H04N 21/25816; H04N 21/25875; H04N 21/25883; H04N 21/266; H04N 21/4524; H04N 21/454; H04N 21/4622; H04N 21/4627; H04N 21/4882; H04N 7/165; G06F 21/10; G06F 21/62; G06Q 30/0261; H04H 60/15; H04H 60/51
See application file for complete search history.

(56) References Cited

U.S. PATENT DOCUMENTS

| 5,652,615 A * | 7/1997 | Bryant | H04H 20/103 725/143 |
| 2003/0200313 A1* | 10/2003 | Peterka | G06F 21/10 709/225 |
| 2010/0125867 A1* | 5/2010 | Sofos | H04N 21/4542 725/28 |
| 2013/0053057 A1* | 2/2013 | Cansino | G06Q 30/0261 455/456.1 |

(Continued)

*Primary Examiner* — Hai V Tran
(74) *Attorney, Agent, or Firm* — Los Angeles Patent Group; Arman Katiraei

(57) ABSTRACT

Some embodiments provide server-side implementation and enforcement of blackout rules for streaming content. A server receives a request from an end user device and extracts a first identifier identifying the end user device and a second identifier identifying the requested stream from the request. The server determines if blackout rules identified for the requested streaming content using the second identifier apply to the end user device based on the first identifier. The blackout rules may restrict IP addresses, IP address subnets, or geographic regions defined using zip codes or DMAs. The first identifier can be an IP address that directly or indirectly maps to the blackout rules. If the first identifier is restricted by a blackout rule, the server identifies the restrictions of the rule, when they apply, and how they are to be applied before dynamically altering the content that is streamed to the end user device.

20 Claims, 8 Drawing Sheets

(56) References Cited

U.S. PATENT DOCUMENTS

| | | | |
|---|---|---|---|
| 2013/0260796 A1* | 10/2013 | Hasek | H04W 4/02 455/456.3 |
| 2014/0259180 A1* | 9/2014 | Shen | G06F 21/10 726/27 |
| 2015/0172731 A1* | 6/2015 | Hasek | H04N 21/2541 725/28 |

* cited by examiner

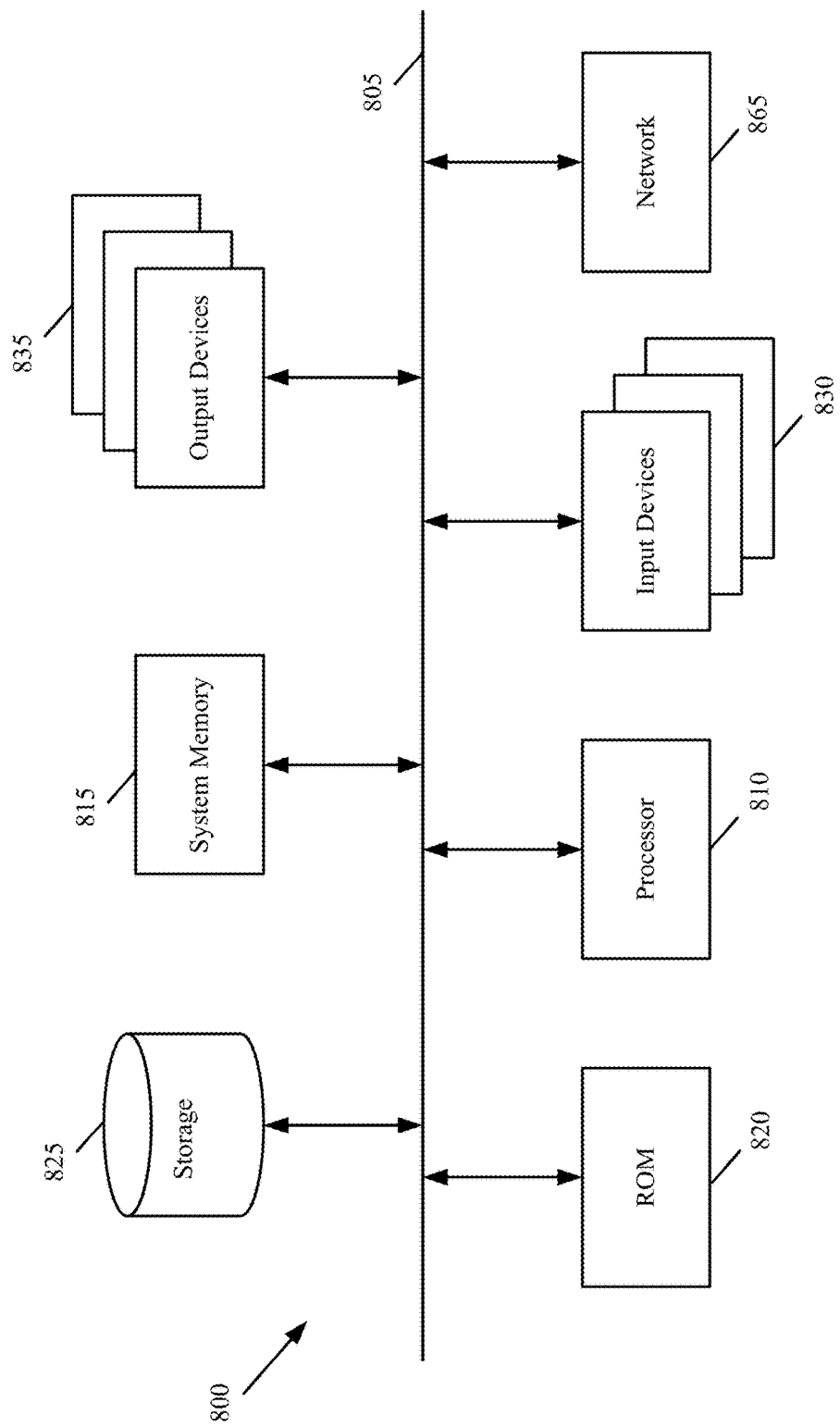

SERVER-SIDE BLACKOUT ENFORCEMENT

BACKGROUND INFORMATION

Broadcasters have a need to implement blackout controls for the content they broadcast. Blackout controls regulate which end users are permitted to view the content broadcasted by a particular broadcaster and which end users are not. Blackout controls are especially important for sports broadcasters. Live sports viewing and other live events are typically subject to various regional restrictions, redistribution restrictions, or other restrictions. Broadcasters negotiate contracts with different sports leagues and/or individual teams. The contracts specify which events or games the broadcaster has the right to broadcast, as well as when and where they can broadcast the events or games. When the broadcaster does not have exclusive rights to broadcast an event nationally, the broadcaster may need to blackout the event in regions where other broadcasters have the broadcasting rights for the event. Blackout controls may also apply to programmed content, such as movies and television shows. Should the broadcaster fail to adhere to the broadcasting restrictions, the broadcaster may be in breach of contractual obligations specified by the content owner.

FIG. 1 illustrates a traditional architecture and model with which broadcasters enforce blackout rules. The architecture involves a broadcaster 110, a super head end (SHE) 120 of a particular content distributor, various video head end/hub offices (VHOs) 130 of the particular content distributor, and end user subscribers 140 of the particular content distributor.

The broadcaster 110 disseminates its content or content of another content provider in encrypted form via satellite or ground based connections to an Integrated Receiver Decoder (IRD) at a SHE 120. The broadcaster 110 may also broadcast alternate content along with primary content, wherein the alternate content is to be used as a substitute for the primary content wherever the primary content is subject to blackout. To specify blackout zones where viewership of the primary content is restricted, the content provider or broadcaster 110 signals the IRD to receive the alternate content, which is then delivered to end user subscribers 140 assigned to that IRD.

The SHE 120 aggregates the encrypted programming content of the broadcaster 110 and other broadcasters. The particular content distributor VHOs 130 then obtain the channels or programming from the SHE 120 that is relevant for the VHO's geographic region. The VHOs 130 decrypt the programming content, enforce any blackout signals embedded with the content, and distribute the content to the end user subscribers 140 associated with each VHO 130 region.

This architecture works for cable, satellite, and fiber optic content distributors and allows broadcasters control over blackout zones for their programming content. However, this same blackout model is unmanageable for over-the-top (OTT) Internet streamed content.

In the distribution architecture of FIG. 1, each VHO 130 is responsible for serving a specific set of end user subscribers 140 that are within the same region as the VHO 130. As such, the VHO 130 knows which blackout zones it is responsible for and can enforce blackout rules specified for those zones without further regard to the specific end user subscriber 140 that receives the content from the VHO 130.

In an OTT Internet based solution, an end user subscriber can theoretically connect to any server in the distribution architecture. The server therefore cannot enforce blackout rules as would a VHO 130, wherein the VHO 130 enforces blackout rules based on the region it serves. In other words, the server cannot simply send the primary content or alternate content to all end users requesting content from the server, because, unlike the end user subscribers 140 that receive content from a VHO 130, the end users requesting content from the server in the OTT Internet based solution can each be located in different regions, with no or different blackout rules applying to those different regions.

To overcome these issues, OTT Internet based content distributors have relied on the end user client player for blackout enforcement. The server embeds blackout zone information as control data that is passed with the content stream sent to an end user client player. The client player then enforces blackout rules defined for the blackout zones when the end user machine is located in one of the zones. This approach, however, limits the content provider's ability to perform per client customizations, requires specialized client players that can extract and execute the blackout rules, and, in many instances, complicates the configurations for distributing streaming content.

With respect to customizations, the content distributor and content provider are limited to sending control data that is supported by the client players. Therefore, if the client players do not support new customizations that the content distributor wants executed, the content distributor needs to first update each and every deployed client player. This also makes client player reusability across different content distributors impossible as each content distributor wants control over updating the client player. To avoid this issue, content distributors distribute their own client players. This in turn degrades the end user experience as the end user may need to download and run different client players when streaming content from different content distributors.

With respect to configuration complication, a content distributor may be required to create different links to the same streaming content in order to differentiate users in different regions. The content distributor then has the issue of presenting the different links to the different users and is reliant on the client players selecting and switching between the different links.

Relying on the client player to enforce the blackout rules also leaves open the possibility of unauthorized access to restricted content. In such instances, the server sends the primary content stream to a client player unless instructed by the client player to send alternate streams. If end users find ways to hack or spoof the client player, then the content distributor will have no ability to enforce the blackout rules against those end users.

Consequently, there is a need to simplify the overhead that is associated with enforcing blackout rules for OTT Internet based delivered content. Specifically, there is a need to replace specialized client players with generic client players and the above noted issues associated with enforcement of blackout rules at the client player. There is further a need to automate blackout enforcement such that no operations involvement is needed, all while still providing broadcasters control over blackout rules affecting their own content.

BRIEF DESCRIPTION OF THE DRAWINGS

A preferred embodiment of methods and systems for over-the-top (OTT) server-side blackout enforcement will now be described, by way of example only, with reference to the accompanying drawings in which:

FIG. 8 illustrates a computer system or server with which some embodiments are implemented.

DETAILED DESCRIPTION OF PREFERRED EMBODIMENTS

Figure 1:
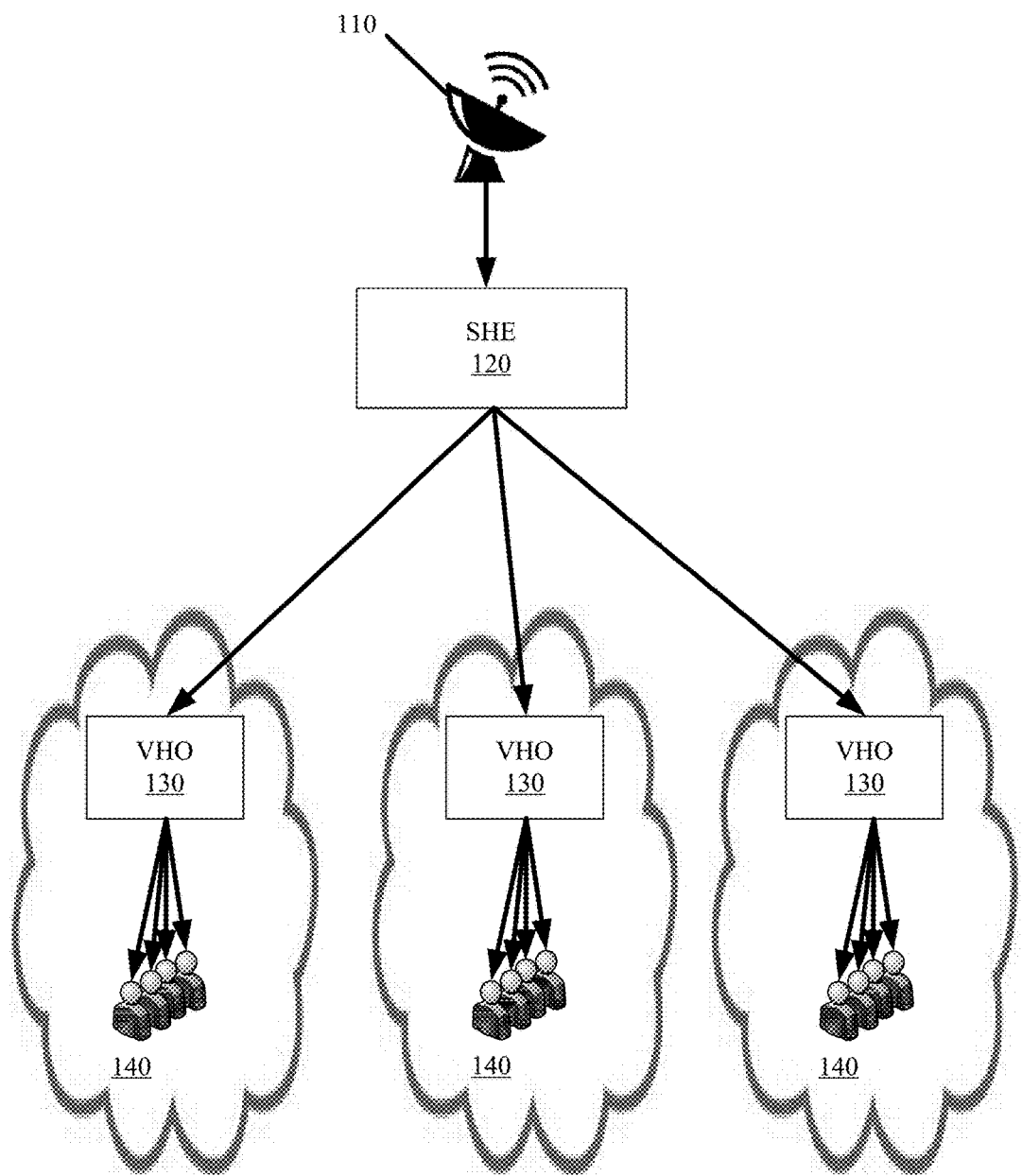
FIG. 1 illustrates a traditional architecture and model with which broadcasters enforce blackout restrictions.
Figure 2:
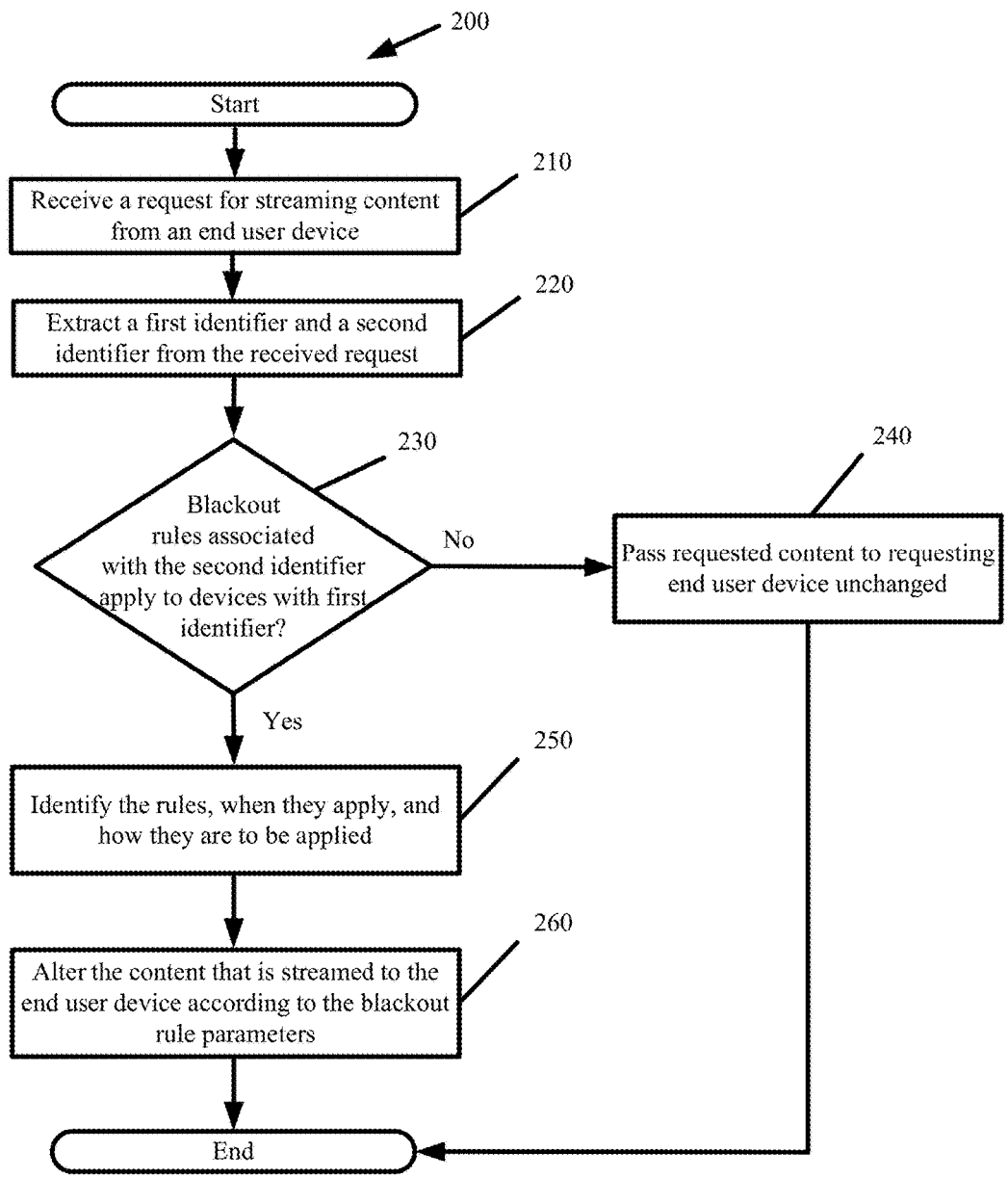
FIG. 2 presents an overview process for implementing over-the-top (OTT) server-side black enforcement in accordance with some embodiments.

Some embodiments provide systems and methods for implementing and enforcing blackout rules for over-the-top (OTT) Internet delivered content streams wholly on the server side such that the end user client player is freed from any such implementation or enforcement. FIG. 2 presents an overview process 200 for implementing OTT server-side black enforcement in accordance with some embodiments.

Process 200 is performed by a server involved in the delivery of streaming content over the Internet or any packet-switched network to one or more end user devices. The server is operated by any content distributor, wherein the content distributor is itself a content provider or content generator, or a service that delivers content streams on behalf of one or more content providers. Such services are provided by content delivery networks (CDNs) such as the one operated by Verizon Digital Media Services. The server performing process 200 and the various embodiments disclosed herein can be any of a caching server, server for a cloud based content management system (CMS) of the content distributor, or a server to which or from which content providers publish their content stream to the content distributor or content distributor CMS, such as an encoder. In any case, the server is operated by the content distributor separate from the end user device requesting or playing back the content streams.

A content stream, also referred to as streaming content, is content that is not static in nature. The content stream can include audio and video components. As such, the term content stream is broadly defined to include any digitized radio broadcasts, podcasts, audio and/or video from any live or recorded event or transmission, any programmed content included content that is broadcast on television, movies, and any other multimedia content that end users consume over packet-switched networks such as the Internet. The terms content stream and streaming content are used interchangeably hereafter.

The end user device is any device with network connectivity (wired or wireless) and content stream playback ability. The end user device executes at least one client player program or application for playback or rendering of the content stream. In the provided embodiments, the client player need not have any functionality for implementing or enforcing blackout rules associated with a requested content stream. So long as the client player supports the codecs with which the server encodes the content stream, the client player can be used to playback the content stream passed from the server with any associated blackout rules being automatically enforced by the server according to the various embodiments presented below. End user devices include smartphones, tablets, portable and desktop computing machines, set-top boxes, streaming boxes, consoles (e.g., video game and other), and any other integrated electronic device such as a television.

With reference back to FIG. 2, process 200 commences upon the server receiving (at 210) a request for a content stream from an end user device. The process extracts (at 220) a first identifier and a second identifier from the received request. The first identifier identifies the end user device. The first identifier is typically the Internet Protocol (IP) address of the end user device. However, the first identifier can alternatively or additionally be the user agent of the end user device, geolocation coordinates obtained directly from the end user device (e.g., global positioning system (GPS) coordinates), subscriber information (such as the end user's username), subscription level, network service provider, and other such identifiers identifying the end user or the end user device. The second identifier identifies the content stream being requested. The second identifier can be extracted from the request Uniform Resource Locator (URL). In some embodiments, the second identifier also identifies the content provider whose content stream is requested. The content provider can be identified from a domain name or customer number identified as part of the URL.

The process determines (at 230) if blackout rules associated with the requested content stream apply to the requesting end user based on the first identifier. In some embodiments, the blackout rules restrict specific IP addresses or IP address subnets from obtaining or viewing the content stream. In some embodiments, the blackout rules restrict specific geographic regions from obtaining or viewing the requested content stream. The geographic regions can be defined using zip codes or designated market areas (DMAs) as some examples. The geographic region in which the end user device operates may be obtained by mapping the end user device's IP address to geolocation coordinates or by directly obtaining the geolocation coordinates from the end user device. The geolocation coordinates can then be mapped to a format in which the geographic regions for the blackout rules are defined. In some embodiments, the blackout rules can also be defined to restrict viewership based on subscriber identifiers (e.g., usernames), device types (i.e., user agents), subscription level (e.g., free subscriber or paid subscriber), or access rights. The process identifies the blackout rules associated with the requested content stream using the second identifier extracted from the request. Specifically, the process determines if any blackout rules have been configured for the requested content stream or content provider providing the requested content stream. Although some other embodiments presented below involve identifying the blackout rules directly from the content stream or in-band messaging or signaling that accompanies the content stream.

If no blackout rules are configured, identified, or none of the configured rules apply to the requesting end user device, the requested content stream passes (at 240) unchanged from the server to the end user device for playback by the client player running on or in conjunction with the end user device. Otherwise, the process identifies (at 250) the rules, when they apply, and how they are to be applied. In enforcing the applicable blackout rules, the process dynamically alters (at 260) the content stream that is streamed to the end user device.

In some embodiments, the server enforces blackout rules and dynamically alters the content stream that is passed to the end user device using different URLs. The server receives several requests for a content stream from different end user devices. In response, the server passes a first URL to the end user devices that are not subject to blackout and that are permitted to receive the content stream, while passing a different second URL to the end user devices that are subject to blackout and that are not permitted to receive the requested content stream. The first URL points to and is used to retrieve the particular content stream from the server or another server operated by the content distributor or partner of the content distributor. The second URL points to and is used to retrieve alternate content in place of the particular content stream from the server or another server operated by the content distributor or partner of the content distributor. In some embodiments, the alternate content is any of a moving slate, a blacked out screen, error message, other live or linear streaming asset, or some other video on-demand asset. By selecting which URL to pass in response to the end user device's content stream request, the server dynamically selects the content to stream to the end user device.

In some other embodiments, the server avoids the URL redirection or URL forwarding and responds directly to end user content stream requests with either the requested content stream or alternated content. Specifically, when the server receives request from an end user device that is not subject to blackout rules specified for the content stream identified in the request, the server directly responds to the request by passing the requested content stream to the end user device instead of passing a first redirect or forwarding URL to the end user device. Similarly, when the server receives a request from an end user device that is subject to blackout rules specified for the content stream identified in the request, the server directly responds to the request by passing the alternate content to the end user device instead of passing a second redirect or forwarding URL to the end user device. Other enforcement can include the server streaming a first variant of the requested content stream to end user devices located in a first region and a second variant of the requested content stream to end user devices located in a different second region, wherein the first variant of the content stream presents a live sporting event with a first set of announcers and the second variant of the content streams presents the same live sporting event with a different second set of announcers.

In some embodiments, the server enforces one or more blackout rules at one or more points within the content stream. In some such embodiments, the server dynamically selects different URLs or different alternate content to pass to an end user device at different points in time throughout the content stream. As will be described below, some embodiments permit scheduling of different triggers or embedding different triggers to accompany the content stream in order to identify when the different blackout rules apply.

Process 200 simplifies content distributor overhead and configuration, because the streaming content can be made accessible via a single link, URL, or address being exposed to all end user devices, rather than exposing different links, URLs, or addresses to different end user operating in different regions. Accordingly, the content distributor can create a single page or website with one link, URL, or address that all end user devices use to request the streaming content irrespective of where those end user device operate and which, if any, of those end user device are subject to blackout.

In some embodiments, content providers create a blackout configuration to define one or more blackout rules and a schedule for when the rules apply to their content streams. The blackout rules defined within a blackout configuration of a particular content provider can be set to apply to all streaming content of the particular content provider. Alternatively, different blackout rules can be set to apply to different streaming content of the particular content provider.

Content provider defined blackout configurations are uploaded to the content distributor or content distributor servers. The servers then reference the appropriate blackout configuration prior to responding to a received end user device request. Specifically, each incoming request includes a URL. The URL identifies the streaming content being requested as well as the content provider that provides the requested streaming content. The identification of the content provider from the request URL allows the server to retrieve the blackout configuration defined by the content provider. The identification of the requested streaming content then allows the server to identify which, if any, blackout rules from the appropriate blackout configuration apply to the streaming content being requested by the end user device.

Figure 3:
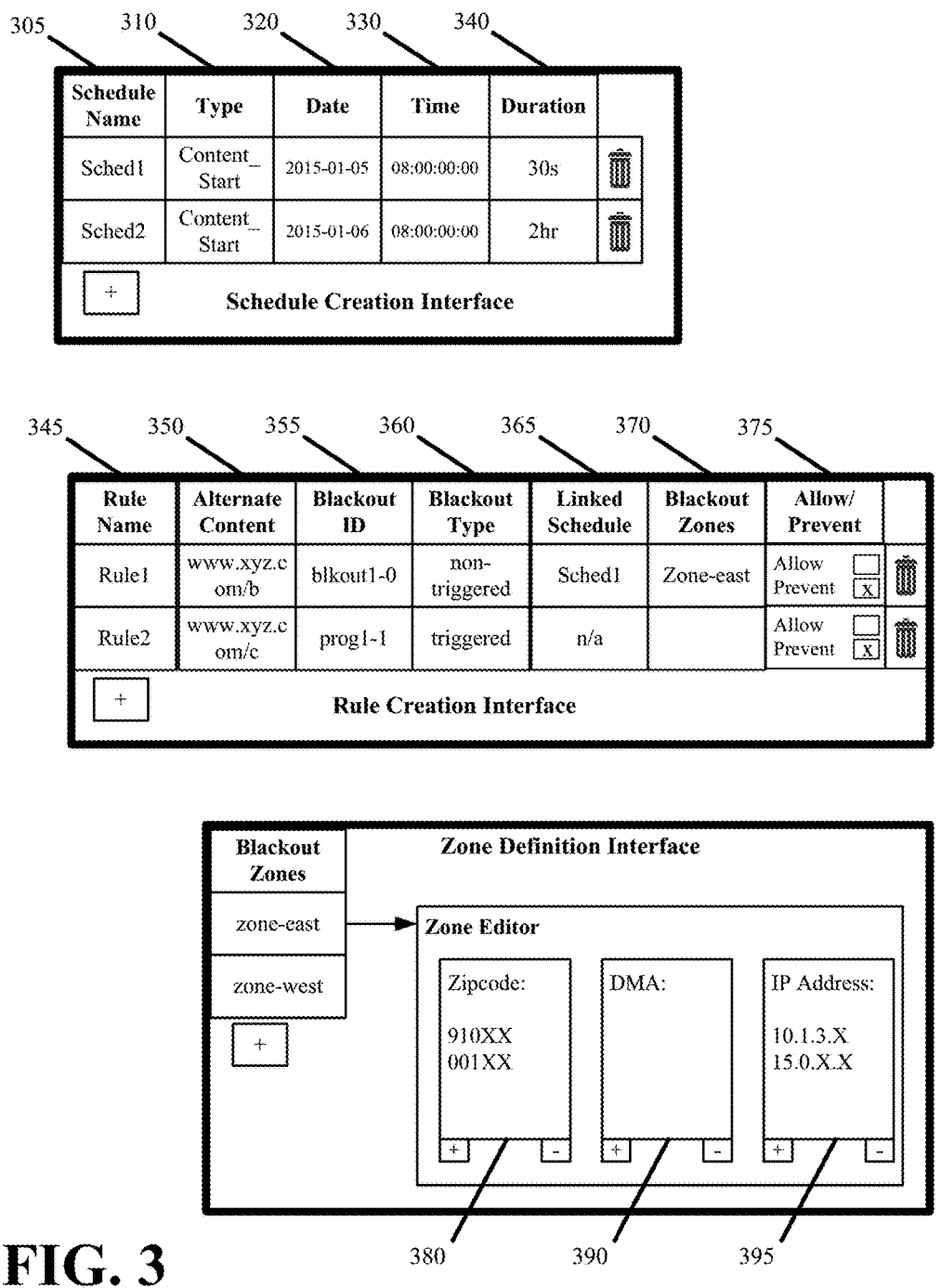
FIG. 3 presents interfaces for defining a blackout configuration in accordance with some embodiments.

FIG. 3 presents interfaces for defining a blackout configuration in accordance with some embodiments. From these interfaces, a content provider can create blackout rules to restrict viewership of their streaming content and further create a schedule for when the blackout rules are to be enforced. It should be noted that content providers can also create a blackout configuration without use of an interface. In some embodiments, content providers define the blackout rules and schedules within a spreadsheet or other delimited or structured file and by uploading such a file to the content distributor or one or more content distributor servers. An application programming interface (API) or other tool can be provided to assist in the creation, modification, and upload of the blackout configuration to the content distributor systems and servers. In some embodiments, API calls and in-band messages automate the creation of blackout rules for a content provider as further provided below.

The first interface of FIG. 3 includes a schedule name 305 field, a break type 310 field, a date 320 field, a time 330 field, and a duration 340 field. The schedule name 305 field links a schedule to a blackout rule. Field 305 can be used to link one schedule to multiple blackout rules or different schedules to different blackout rules. Fields 310-340 define parameters for the linked schedules. The break type 310 defines whether a blackout rule is to apply at the beginning of streaming content, at some specific point within the streaming content, or intermittently throughout streaming content. The date 320 and timecode 330 are additional means with which to specify when the blackout rule is to be enforced. Content providers can preset blackout rules using the date 320 and timecode 330 parameters. The duration 340 determines how long a blackout rule remains in effect, although the duration of a blackout rule can also be signaled using in-band messaging or signaling accompanying the content stream in some other embodiments described below.

The second interface of FIG. 3 is used to specify a blackout rule definition. Each blackout rule definition identifies one or more content streams to which the rule applies, alternate content for end user devices subject to blackout by the rule, zoning information, and whether to include or exclude users in the specified zones. Accordingly, the blackout rule definition interface includes a rule name 345 field, an alternate content 350 field, a blackout identifier 355 field, a blackout type 360 field, a schedule name field 365 field, a zone 370 field, and allow/prevent 375 field. The rule name 345 is an identifier for referencing the rule. The alternate content 350 identifies one or more alternate content for presentation to an end user device that is restricted from viewing the primary content by the rule. The blackout identifier 355 associates the blackout rule to one or more content streams. In some embodiments, the blackout identifier 355 specifies the names of one or more streams to which the associated blackout rule applies. The blackout type 360 indicates whether the blackout rule is triggered or non-triggered, wherein a triggered rule is one that is invoked by in-band messaging or signaling that accompanies the content stream, and wherein a non-triggered rule is one that is activated according to parameters of a schedule identified by the schedule name field 365. The allow/prevent 375 can be set for each blackout rule and this parameter specifies whether users meeting the criteria defined by the corresponding blackout rule are allowed or restricted from viewing the content stream to which the rule applies.

The third interface of FIG. 3 is used to define the zones 370 in which a blackout rule is enforced. In this figure, zones can be defined according to any one or more zip codes 380, DMAs 390, or IP addresses 395. Some embodiments define blackout zones using subscriber identifiers (e.g., usernames), device types (i.e., user agents), subscription level (e.g., free subscriber or paid subscriber), geolocation coordinates, access rights, or other identifiers in addition to or instead of the illustrated zip codes 380, DMAs 390, or IP addresses 395.

In some embodiments, the blackout configuration is stored to a file. The blackout configuration file is provided to each of the content distributor servers that implement and enforce the specified blackout rules. As noted above, when a content distributor server receives a request for a particular content stream, the server parses the request to identify the content provider originating the particular content stream, as well as, the particular content stream being requested. The content provider and particular content stream being requested can be identified from the URL provided as part of the request. The server then performs an internal lookup to identify the blackout configuration file that includes the blackout rules to enforce against end users requesting that content provider's content stream or that particular content stream.

As noted above, triggered blackout rules are not triggered according to any defined schedules, but are rather triggered by in-stream or in-band messaging that accompanies audio and video packets, segments, or messaging encoding the streaming content. For such triggered blackout rules, schedule definitions can be omitted from the blackout configuration. The in-stream or in-band messaging are different markers, indicators, or metadata that signal when enforcement of different triggered blackout rules start or end.

Typically, in-stream or in-band messaging is defined to signal splicing and insertion opportunities within the streaming content. For instance, Society of Cable Telecommunications Engineers (SCTE) messaging, such as SCTE-30 and SCTE-35 messages, are used to insert locally generated commercials or advertisements into a Moving Pictures Experts Group (MPEG) transport stream. The SCTE messages are multiplexed with the audio and video packets in the transport stream of the streaming content.

Some embodiments adapt the SCTE message payload or similar in-stream messaging to carry the start and end blackout rule markers or metadata. In some embodiments, the "no_regional_blackout_flag" field of a SCTE35 message is used for rules-based blackout, the "web_delivery_allowed_flag" field for blackout of a whole channel, and the "program identifier" field to identify which blackout rule is triggered by the SCTE35 message. When the program identifier within a SCTE35 message is received by a content distributor server, the server attempts to match the program identifier to a blackout identifier specified within a blackout configuration. Upon matching the program identifier to a blackout identifier, the server enforces the blackout rule that is associated with the blackout identifier from the corresponding configuration. In some embodiments, the program identifier may be omitted from the in-stream messaging signaling a blackout. In some such embodiments, the in-stream messaging provides for an entire channel blackout. Accordingly, the server will blackout the asset to viewers upon receiving the signaling. Rather than refer to a blackout rule defined within a configuration using the program identifier, in some embodiments, the in-stream messaging payload is modified to carry the blackout rule information directly with the in-stream messaging. In this implementation, the server can selectively blackout different end users solely based on the in-stream messaging without referencing a separate blackout configuration. In some embodiments, the content provider is provided an encoder, API, or other tool for generating the streaming content source feed with the blackout rule markers, indicators, or metadata embedded within SCTE messages or other signaling accompanying the encoded streaming content source feed.

Figure 4:
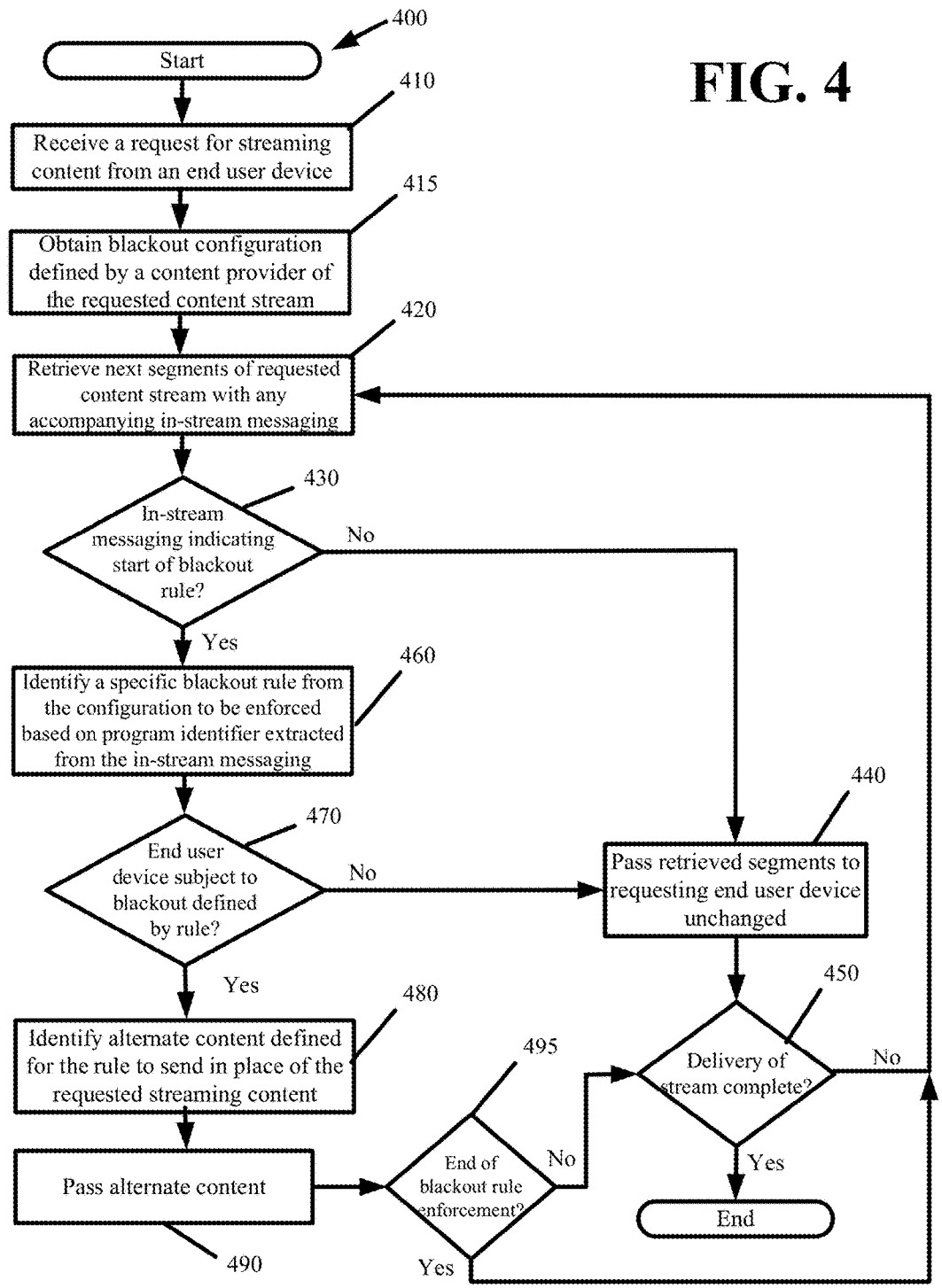
FIG. 4 presents a process performed by a content distributor server for enforcing blackout restrictions for OTT distributed streaming content based on a blackout configuration with blackout rules but without a schedule, and in-stream messaging indicating start and end of the blackout rules in accordance with some embodiments.

FIG. 4 presents a process 400 performed by a content distributor server for enforcing blackout restrictions for OTT distributed streaming content based on a blackout configuration with blackout rules but without a schedule, and in-stream messaging indicating start and end of the blackout rules in accordance with some embodiments. The process 400 commences by receiving (at 410) a request for a content stream from an end user device.

In response to the received request, the process obtains (at 415) the blackout configuration defined by a content provider of the requested content stream. The process also retrieves (at 420) next segments of the requested content stream. The process processes any in-stream messaging accompanying the retrieved segments to identify (at 430) any markers, indicators, or metadata indicating the start for enforcement of a blackout rule.

The process passes (at 440) the retrieved segments to the requesting end user device when the segments do not include any in-stream messaging indicating the start for enforcement of a blackout rule. The process continues passing the retrieved segments by reverting to step 420 until the content stream is complete (at 450) or upon encountering (at 430) in-stream messaging with a blackout rule enforcement starting marker, indicator, or metadata.

However, upon encountering in-stream messaging with a blackout rule enforcement marker, indicator, or metadata, the process extracts a program identifier from the in-stream messaging marker, indicator, or metadata. By referencing the blackout configuration obtained at 415 with the program identifier, the process identifies (at 460) a specific blackout rule from the configuration to be enforced. As noted above, in-stream messaging may omit the program identifier altogether, and either specify a blackout of the content stream for all users or specify zones where viewership should be restricted. In any case, the process then determines (at 470) if the end user device is subject to the identified blackout rule based on the end user device identifier (i.e., IP address) being within a list of restricted identifiers specified for the blackout rule. If not, the process passes (at 440) the streaming content segments to the end user device. If the end user device is subject to blackout, the process identifies (at 480) the alternate content specified for the blackout rule. The process then passes (at 490) the alternate content to the end user until encountering (at 495) in-stream messaging with a marker, indicator, or metadata indicating the end for enforcement of the blackout rule or the streaming content ends.

Figure 5:
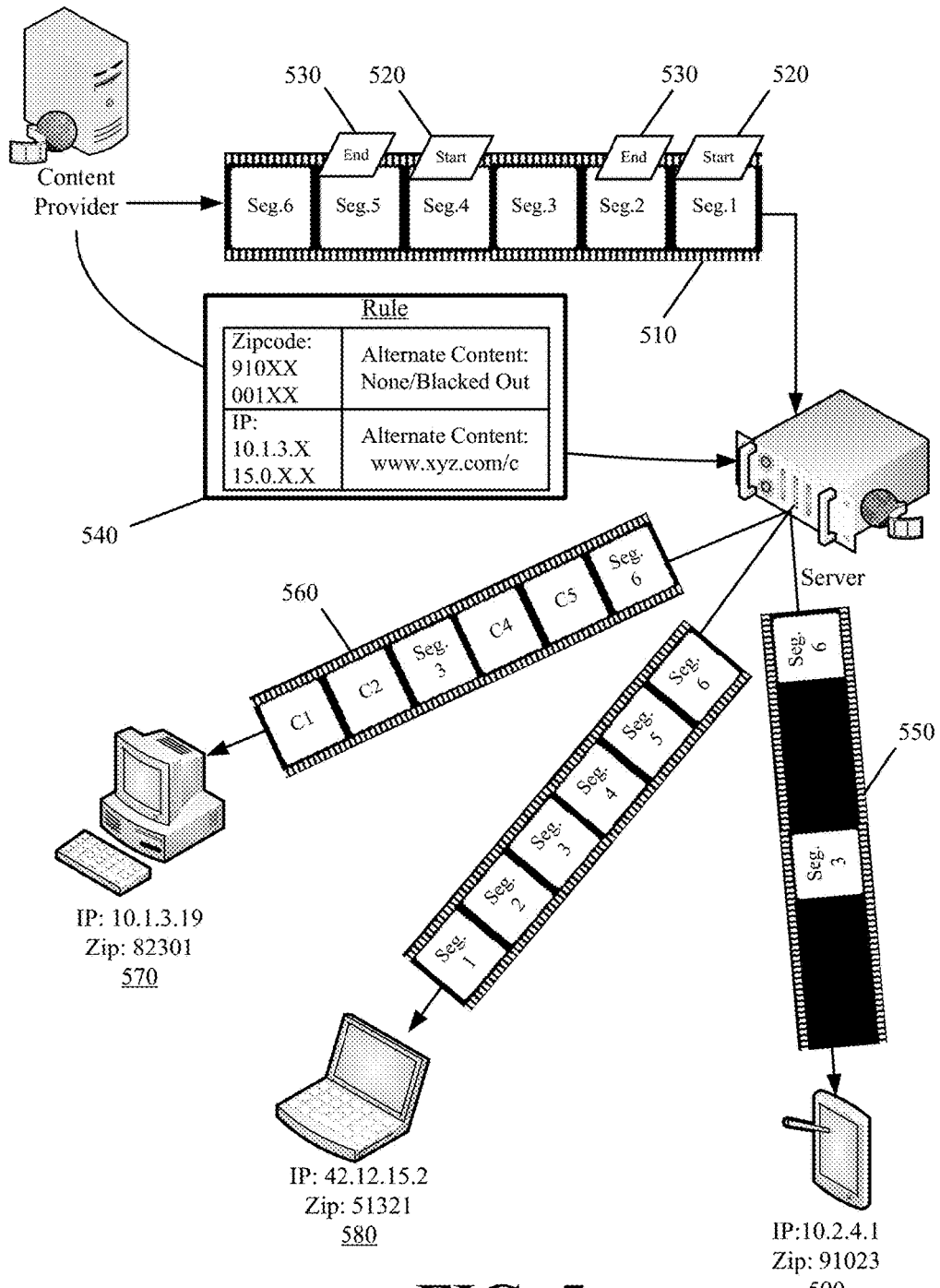
FIG. 5 conceptually illustrates in-stream messaging with markers, indicators, or metadata indicating the start and end for enforcement of various blackout rules defined for a particular content stream.

FIG. 5 conceptually illustrates in-stream messaging with markers, indicators, or metadata indicating the start and end for enforcement of various blackout rules defined for a particular content stream 510. A blackout configuration 540 defines the blackout rules that are triggered by the in-stream messaging. The blackout configuration 540 may be stored on or made accessible to the server serving the particular streaming content 510 to requesting end user devices.

The figure illustrates segments of the particular streaming content 510 and in-stream messaging embedded at various points within the stream 510. As can be seen, in-stream messages indicating the start of blackout enforcement are present at streaming content segments 520 and in-stream messages indicating the end of blackout enforcement are present at streaming content segments 530.

The blackout configuration 540 defines a first blackout rule, that when triggered by the in-stream messaging, restricts viewership of the particular content stream 510 by a first set of end users that operate within certain zip codes. When triggered, the first blackout rule causes first alternate content 550 to be presented to the restricted end user devices. The blackout configuration 540 further defines a second blackout rule, that when triggered by the in-stream messaging, restricts viewership of the particular content stream 510 by a second set of end users that are identified with certain IP address prefixes. When triggered, the second blackout rule causes different second alternate content 560 to be presented to the restricted end user devices.

Whenever the server encounters a blackout enforcement start indicator, the server checks whether any of the receiving end users are subject to any of the blackout rules defined within the blackout configuration 540. As can be seen from the figure, the server identifies the IP address of a first end user device 570 as one that is restricted by the second blackout rule defined for the streaming content 510 within the blackout configuration 540, a second end user device 580 that is not subject to any of the blackout rules defined for streaming content 510, and a third end user device 590 that operates within a zip code that is restricted by the first blackout rule defined for the streaming content 510 within the blackout configuration 540. Accordingly, the server passes the streaming content 510 unaltered to the second end user device 580. The server passes to the first end user device 570, the second alternate content in place of certain streaming content 510 segments between the in-stream messaging signaling the start and end of the blackout enforcement. The server passes to the third end user device 590, the first alternate content in place of certain streaming content 510 segments between the in-stream messaging signaling the start and end of the blackout enforcement.

The in-stream messaging or SCTE messages can be adapted to trigger certain blackout rules by embedding different program identifiers within the in-stream messaging. In some such embodiments, the server extracts the program identifiers from the in-stream messaging and compares the program identifiers with the blackout identifiers defined within a blackout configuration. When a program identifier matches a blackout identifier, the server enforces the corresponding blackout rule associated with the blackout identifier.

Figure 6:
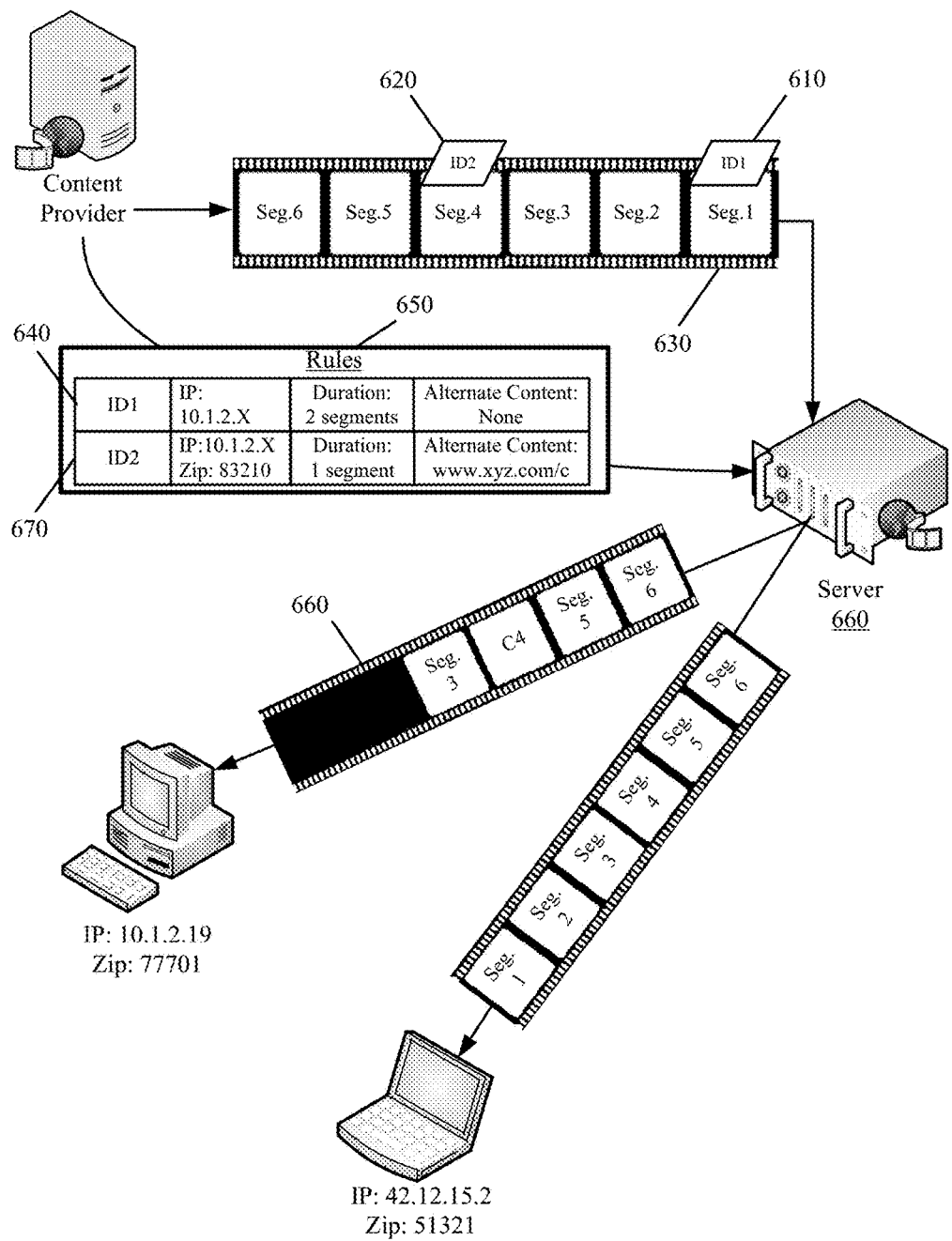
FIG. 6 illustrates using different blackout identifiers within in-stream messaging to trigger enforcement of different blackout rules by the content distributor server.

FIG. 6 illustrates using different program identifiers within in-stream messaging to trigger enforcement of different blackout rules by the content distributor server. The figure illustrates two SCTE messages 610 and 620 inserted at different locations within streaming content 630. The SCTE message insertion is performed by any of an encoder, API, or other tool used by the content provider to encode the original source feed and produce the streaming content 630 for distribution by the content distributor.

The first SCTE message 610 specifies a first program identifier. The first program identifier maps to a first blackout rule 640 identified by a corresponding blackout identifier within a blackout configuration 650 created by the content provider. Accordingly, when the server 660 configured with the configuration 650 encounters the first program identifier while streaming content 630 to an end user device, the server 660 enforces the first blackout rule 640 if applicable to the end user device.

The second SCTE message 620 specifies a different second program identifier. The second program identifier maps to a second blackout rule 670 identified by a corresponding second blackout identifier within the blackout configuration 650. When the server 660 configured with the configuration 650 encounters the second program identifier while streaming the content 630 to the end user device, the server 660 enforces the second blackout rule 670 if applicable to the end user device.

As shown, the first blackout rule 640 specifies different zip codes, DMAs, IP addresses that are subject to blackout than the second blackout rule 670. Specifically, the first blackout rule 640 is enforced against a first set of IP addresses, whereas the second blackout rule 670 is enforced against a different second set of IP addresses and a geographic region defined by a zip code. Also, the first blackout rule 640 designates different alternate content than the second blackout rule 670 to send to users subject to the respective blackouts.

In this manner, the content provider can set different rules to apply within a given content stream. The content provider can also apply different subsets of the defined rules to different content streams of the content provider. The content provider thereby avoids having to create a different rule for each content stream that is delivered by the content distributor.

Figure 7:
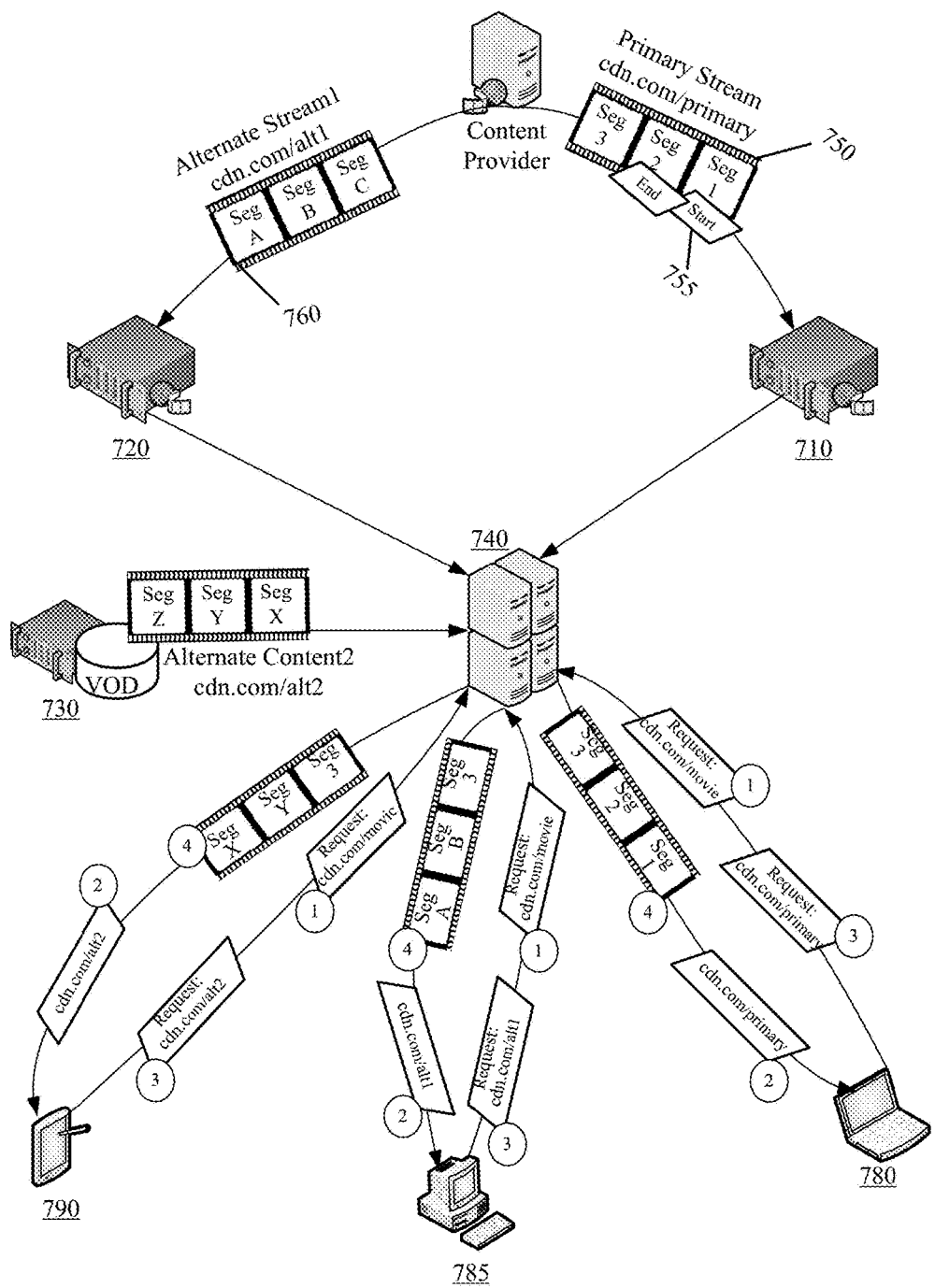
FIG. 7 illustrates a detailed content distributor architecture enforcing blackout restrictions in accordance with some embodiments.

FIG. 7 illustrates a detailed content distributor architecture enforcing blackout restrictions in accordance with some embodiments. The content distributor architecture includes first and second encoders 710 and 720, a video on-demand repository 730, and one or more distribution servers 740 of a content management system (CMS). A content provider publishes a primary content stream 750 to the first encoder 710 and an alternate content stream 760 to the second encoder 720.

SCTE35 messages are submitted at various points along the primary content stream 750 to indicate the start and stop for enforcement of a blackout rule. When the first encoder 710 receives a SCTE35 message 755 indicating the start of a blackout rule enforcement, it notifies the CMS servers 740.

Users 780, 785, and 790 submit requests for the primary content stream 710 to one of the CMS servers 740. The CMS server 740 geo-locates each of the users 780, 785, and 790 based on their respective IP addresses. User 780 is not subject to the blackout rule triggered by the SCTE35 message 755 and so, the CMS server 740 sends the primary content stream 750 URL to the user 780 for the user 780 to subsequently request the primary content stream 750 from the CMS server 740. User 785 is subject to the blackout rule triggered by the SCTE35 message 755 and so, the CMS server 740 sends a first alternate content URL to the user 785 for the user 785 to subsequently request the alternate content stream 760 being published to the second encoder 720. User 790 is also subject to the blackout rule triggered by the SCTE35 message 755 and so, the CMS server 740 sends a second alternate content URL to the user 790 for the user 790 to subsequently request the on-demand content from the on-demand repository 730. Once the first encoder 710 receives a new SCTE35 message with the blackout flag set to normal indicating the end for enforcement of the blackout restriction, the first encoder 710 notifies the CMS server 740 which then begins passing the primary content stream to all users including those that were previously subject to the blackout restriction.

Instead of the in-stream or in-band messaging that triggers the start and end of blackout rule enforcement, some embodiments provide content providers with an API that directly notifies the content distributor server or encoder regarding when enforcement for different blackout rules are to begin and end. In some such embodiments, the API is communicably coupled to the encoder receiving the content stream from the content provider. Through an interface, script, or other means, the start and end triggers are provided to the API that then forwards the information to the encoder for enforcement by the encoder or other servers of the content distributor. The triggers can be preconfigured and provided in advance. Alternatively, the API can pass the triggers as they are specified by the content provider, thereby providing the content provider with real-time control over blackout enforcement.

In some embodiments, the API passes all blackout rule information along with the start and end enforcement triggers. Consequently, the servers enforcing the blackout rules need not be preconfigured with a separate blackout configuration. The server dynamically enforces blackout rules as they are received from the API. In some such embodiments, the content provider configures the blackout rules it wants enforced prior to encoding the source feed. The blackout rules are set using the API provided as part of an encoder used by the content provider to encode the source feed. The API then embeds the blackout restrictions as metadata included with the source feed encoding. In some embodiments, the metadata is carried as part of an MPEG transport stream or elementary stream as used by streaming protocols such as the HyperText Transfer Protocol (HTTP) Live Streaming protocol.

The content distributor server is configured to monitor and process the metadata when streaming content to end user devices. Upon encountering metadata defining a blackout rule, the server extracts the rule parameters, determines if restrictions apply to the end user device receiving the stream, and enforces the rules if they are applicable to the end user device.

Many of the above-described processes and components are implemented as software processes that are specified as a set of instructions recorded on a non-transitory computer-readable storage medium (also referred to as computer-readable medium). When these instructions are executed by one or more computational element(s) (such as processors or other computational elements like ASICs and FPGAs), they cause the computational element(s) to perform the actions indicated in the instructions. Server, computer, and computing machine are meant in their broadest sense, and can include any electronic device with a hardware processor including cellular telephones, smartphones, portable digital assistants, tablet devices, laptops, notebooks, desktop computers, and networked computers. Examples of computer-readable media include, but are not limited to, CD-ROMs, flash drives, RAM chips, hard drives, EPROMs, etc.

FIG. 8 illustrates a computer system or server with which some embodiments are implemented. Such a computer system includes various types of computer-readable mediums and interfaces for various other types of computer-readable mediums that implement the various methods and machines described above. Computer system 800 includes a bus 805, a processor 810, a system memory 815, a read-only memory 820, a permanent storage device 825, input devices 830, and output devices 835.

The bus 805 collectively represents all system, peripheral, and chipset buses that communicatively connect the numerous internal devices of the computer system 800. For instance, the bus 805 communicatively connects the processor 810 with the read-only memory 820, the system memory 815, and the permanent storage device 825. From these various memory units, the processor 810 retrieves instructions to execute and data to process in order to execute the processes of the embodiments described above. The processor 810 is a processing device such as a central processing unit, integrated circuit, graphical processing unit, etc.

The read-only-memory (ROM) 820 stores static data and instructions that are needed by the processor 810 and other modules of the computer system. The permanent storage device 825, on the other hand, is a read-and-write memory device. This device is a non-volatile memory unit that stores instructions and data even when the computer system 800 is off. Some embodiments use a mass-storage device (such as a magnetic, solid-state disk, or optical disk and its corresponding disk drive) as the permanent storage device 825.

Other embodiments use a removable storage device (such as a flash drive or solid-state disk) as the permanent storage device. Like the permanent storage device 825, the system memory 815 is a read-and-write memory device. However, unlike storage device 825, the system memory is a volatile read-and-write memory, such as random access memory (RAM). The system memory stores some of the instructions and data that the processor needs at runtime. In some embodiments, the processes are stored in the system memory 815, the permanent storage device 825, and/or the read-only memory 820.

The bus 805 also connects to the input and output devices 830 and 835. The input devices enable the user to communicate information and select commands to the computer system. The input devices 830 include alphanumeric keypads (including physical keyboards and touchscreen keyboards), pointing devices (also called "cursor control devices"). The input devices 830 also include audio input devices (e.g., microphones, MIDI musical instruments, etc.). The output devices 835 display images generated by the computer system. The output devices include printers and display devices, such as liquid crystal displays (LCD).

Finally, as shown in FIG. 8, bus 805 also couples computer 800 to a network 865 through a network adapter (not shown). In this manner, the computer can be a part of a network of computers (such as a local area network ("LAN"), a wide area network ("WAN"), or an Intranet, or a network of networks, such as the Internet.

As mentioned above, the computer system 800 may include one or more of a variety of different computer-readable media. Some examples of such computer-readable media include RAM, ROM, compact discs (CD-ROM), digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable blu-ray discs, and any other optical or magnetic media.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method comprising:
obtaining a blackout configuration for a first content stream at a particular streaming server from a content provider originating said first content stream, wherein the particular streaming server streams the first content stream to a plurality of end user devices on behalf of the content provider, and wherein the blackout configuration comprises a plurality of blackout rules and a plurality of program identifiers, each program identifier of the plurality of program identifiers signaling enforcement of a different rule from the plurality of blackout rules at different times during playback of the first content stream;
monitoring presence of program identifiers within segments of the first content stream at the particular streaming server in advance of passing said segments from the particular streaming server to an end user device;
detecting a particular program identifier within a particular segment of the first content stream at the particular streaming server as a result of said monitoring by the particular streaming server;
matching the particular program identifier from the particular segment to a program identifier from the plurality of program identifiers in said blackout configuration;
triggering a first blackout rule from the plurality of blackout rules of the blackout configuration in response to (i) said matching of the particular program identifier from the particular segment to the program identifier from the plurality of program identifiers in the blackout configuration, and (ii) the first blackout rule linked with the program identifier from the plurality of program identifiers in the blackout configuration; and
modifying the first content stream at the particular streaming server while the particular streaming server serves the first content stream to the end user device, wherein modifying the first content stream comprises blacking-out the first content stream over a duration corresponding to at least a duration of the particular segment in the first content stream as a result of the end user device being subject to said first blackout rule.

2. The method of claim 1, wherein the particular program identifier from the particular segment is a start indicator, the method further comprising passing segments from a second content stream in place of segments from the first content stream until encountering an end indicator in a subsequent segment of the first content stream.

3. The method of claim 2 further comprising passing the subsequent segment from the first content stream in place of segments from the second content stream upon encountering said end indicator.

4. The method of claim 1, wherein the particular program identifier from the particular segment comprises a Society of Cable Telecommunications Engineers (SCTE) message.

5. The method of claim 1 further comprising detecting a second program identifier in a subsequent segment of the first content stream as a result of said monitoring.

6. The method of claim 5 further comprising (i) retrieving at least a different second blackout rule based on the second program identifier from said subsequent segment matching a program identifier from the plurality of program identifiers in the blackout configuration, said matching triggering enforcement of said second blackout rule, and (ii) passing an alternate segment from a third content stream in place of the subsequent segment as a result of the end user device being subject to said second blackout rule.

7. A streaming device comprising:
a non-transitory computer-readable medium storing a set of processor-executable instructions; and
one or more processors configured to execute the set of processor-executable instructions, wherein executing the set of processor-executable instructions causes the one or more processors to:
obtain a blackout configuration for a first content stream from a content provider originating said first content stream, wherein the blackout configuration comprises a plurality of blackout rules and a plurality of program identifiers, each program identifier of the plurality of program identifiers signaling enforcement of a different rule from the plurality of blackout rules at different times during playback of the first content stream;
monitor presence of program identifiers within segments of the first content stream in advance of passing said segments to an end user device;
detect a particular program identifier within a particular segment of the first content stream as a result of said monitoring;
match the particular program identifier from the particular segment to a program identifier from the plurality of program identifiers in said blackout configuration;
trigger a first blackout rule from the plurality of blackout rules of the blackout configuration in response to (i) said matching of the particular program identifier from the particular segment to the program identifier from the plurality of program identifiers in the blackout configuration, and (ii) the first blackout rule linked with the program identifier from the plurality of program identifiers in the blackout configuration; and
modify the first content stream while serving the first content stream to the end user device, wherein modifying the first content stream comprises blacking-out the first content stream over a duration corresponding to at least a duration of the particular segment in the first content stream as a result of the end user device being subject to said first blackout rule.

8. The streaming device of claim 7, wherein the processor-executable instructions further include processor-executable instructions to map an identifier associated with the end user device to a geographic region.

9. The streaming device of claim 8, wherein the identifier is an end user device address, the geographic region is a particular zip code, and the first blackout rule comprises a list of restricted zip codes inclusive of the particular zip code.

10. The streaming device of claim 7, wherein the processor-executable instructions further include processor-executable instructions to map an identifier associated with the end user device to a particular designated market area (DMA), and wherein the first blackout rule comprises a list of restricted DMAs inclusive of the particular DMA.

11. The streaming device of claim 7, wherein the processor-executable instructions to modify the first content stream further include processor-executable instructions to pass at least one alternate segment during the blacking-out of the first content stream over the duration corresponding to at least the duration of the particular segment.

12. The streaming device of claim 11, wherein the at least one alternate segment comprises any of an error message or segments of a second content stream that is different than the first content stream.

13. The streaming device of claim 7, wherein the first blackout rule identifies alternate content to pass to the end user device, and wherein the processor-executable instructions to modify the first content stream further include processor-executable instructions to provide the alternate content to the end user device during the blacking-out of the first content stream over the duration corresponding to at least the duration of the particular segment.

14. The streaming device of claim 7, wherein the processor-executable instructions further include processor-executable instructions to pass segments of the first content stream unaltered to a different second end user device as a result of the second end user device not being subject to said first blackout.

15. A non-transitory computer-readable medium, storing a set of processor-executable instructions, which, when executed by one or more processors of a streaming device, cause the one or more processors to:
obtain a blackout configuration for a first content stream from a content provider originating said first content stream, wherein the blackout configuration comprises a plurality of blackout rules and a plurality of program identifiers, each program identifier of the plurality of program identifiers signaling enforcement of a different rule from the plurality of blackout rules at different times during playback of the first content stream;
monitor presence of program identifiers within segments of the first content stream in advance of passing said segments to an end user device;
detect a particular program identifier within a particular segment of the first content stream as a result of said monitoring;
match the particular program identifier from the particular segment to a program identifier from the plurality of program identifiers in said blackout configuration;
trigger a first blackout rule from the plurality of blackout rules of the blackout configuration in response to (i) said matching of the particular program identifier from the particular segment to the program identifier from the plurality of program identifiers in the blackout configuration, and (ii) the first blackout rule linked with the program identifier from the plurality of program identifiers in the blackout configuration; and
modify the first content stream while serving the first content stream to the end user device, wherein modifying the first content stream comprises blacking-out the first content stream over a duration corresponding to at least a duration of the particular segment in the first content stream as a result of the end user device being subject to said first blackout rule.

16. The non-transitory computer-readable medium of claim 15, wherein the particular program identifier from the particular segment is a start indicator, and wherein the processor-executable instructions further include processor-executable instructions to pass segments from a second content stream in place of segments from the first content stream until encountering an end indicator in a subsequent segment of the first content stream.

17. The non-transitory computer-readable medium of claim 16, wherein the processor-executable instructions further include processor-executable instructions to pass the subsequent segment from the first content stream in place of segments from the second content stream upon encountering said end indicator.

18. The non-transitory computer-readable medium of claim 16, wherein the processor-executable instructions further include processor-executable instructions to detect a second program identifier in a subsequent segment of the first content stream as a result of said monitoring.

19. The non-transitory computer-readable medium of claim 18, wherein the processor-executable instructions further include processor-executable instructions to (i) retrieve at least a different second blackout rule based on the second program identifier from said subsequent segment matching a program identifier from the plurality of program identifiers in the blackout configuration, said matching triggering enforcement of said second blackout rule, and (ii) pass an alternate segment from a third content stream in place of the particular segment as a result of the end user device being subject to said second blackout rule.

20. The non-transitory computer-readable medium of claim 15, wherein the particular program identifier from the particular segment comprises a Society of Cable Telecommunications Engineers (SCTE) message.

* * * * *